United States Patent
Solgaard et al.

(10) Patent No.: US 12,253,667 B2
(45) Date of Patent: Mar. 18, 2025

(54) HIGH CONTRAST SPATIAL LIGHT MODULATOR

(71) Applicant: SILICON LIGHT MACHINES CORPORATION, San Jose, CA (US)

(72) Inventors: Olav Solgaard, Stanford, CA (US); Alexander Payne, Ben Lommond, CA (US); James Hunter, Campbell, CA (US); Stephen Hamann, Mountain View, CA (US)

(73) Assignee: SILICON LIGHT MACHINES CORPORATION, San Jose, CA (US)

( * ) Notice: Subject to any disclaimer, the term of this patent is extended or adjusted under 35 U.S.C. 154(b) by 564 days.

(21) Appl. No.: 17/689,868

(22) Filed: Mar. 8, 2022

(65) Prior Publication Data
US 2022/0291500 A1 Sep. 15, 2022

Related U.S. Application Data

(60) Provisional application No. 63/158,789, filed on Mar. 9, 2021.

(51) Int. Cl.
G02B 26/08 (2006.01)
(52) U.S. Cl.
CPC ................ *G02B 26/0808* (2013.01)
(58) Field of Classification Search
CPC .................................... G02B 26/0808
See application file for complete search history.

(56) References Cited

U.S. PATENT DOCUMENTS

| 7,248,278 | B1 | 7/2007 | Carlisle et al. |
| 10,665,182 | B1 | 5/2020 | Payne et al. |
| 2006/0126155 | A1 | 6/2006 | Koawarz et al. |
| 2006/0146392 | A1* | 7/2006 | An ............... G02B 26/0808 359/291 |
| 2017/0068319 | A1 | 3/2017 | Viswanathan |
| 2018/0299664 | A1 | 10/2018 | Payne et al. |
| 2019/0116346 | A1 | 4/2019 | Hashimoto |

OTHER PUBLICATIONS

International Search Report for International Application PCT/US22/19605 Jun. 27, 2022.
Written Opinion of International Searching Authority Application PCT/US22/19605 Jun. 27, 2022.

* cited by examiner

*Primary Examiner* — James C. Jones
(74) *Attorney, Agent, or Firm* — William Nuttle

(57) ABSTRACT

Microelectromechanical systems based spatial light modulators (SLMs), and display systems and methods for operating the same are described. Generally, the SLM includes a linear array of a number of electrostatically deflectable ribbons suspended over a surface of a substrate. Each ribbon includes a split-ribbon portion with a plurality of diffractors, each diffractor including a first light reflective surface on a linear portion of the split-ribbon portion and an opening through which a second light reflective surface affixed to the substrate is exposed. The first light reflective surface and the second light reflective surface have equal areas, and when one or more of the ribbons is deflected towards the surface of the substrate a coherent light reflected from the first light reflective surface is brought into constructive or destructive interference with light reflected from the second light reflective surface. The display system can include a projector or a head mounted unit.

20 Claims, 13 Drawing Sheets

1602
Providing A Display System Including Multiple Light Sources Each Generating A Coherent Light At A Different Wavelength (Or A Single Light Source Capable Of Sequentially Generating Coherent Light At Different Wavelengths At Different Times), And A Single, Compact SLM Tuned Including A Single, Linear Array Of Active-Ribbons With Split Ribbon Portions 1604
Illuminating At Least A Portion Of The Linear Array Including The Split Ribbon Portions With A Coherent Light From One Of The Multiple Light Sources 1606
Operating A Driver Including A Number Of Drive Channels To Deflect One Or More Of The Active-Ribbons To Bring Coherent Light Reflected From The Active-Ribbons Into Interference With Light Reflected From A Static Light Reflective Surface 1608
The Modulated Light Is Then Spatially Filtering And Scanning The Reflected Light Along A Second Axis And Projecting The Light Onto An Imaging Plane 1610
At A Second Or Subsequent Time Repeating The Previous Steps With Coherent Light From Another Of The Multiple Light Sources To Provide Time Multiplexed Color Image In The Imaging Plane

*FIG. 16*

HIGH CONTRAST SPATIAL LIGHT MODULATOR

CROSS-REFERENCE TO RELATED APPLICATIONS

This application claims the benefit of priority under 35 U.S.C. 119(e) to U.S. Provisional Patent Application Ser. No. 63/158,789, filed Mar. 9, 2021, which is incorporated by reference herein in its entirety.

TECHNICAL FIELD

This disclosure generally relates to display systems and projectors including is a microelectromechanical systems (MEMS) based spatial light modulators (SLMs), and more particularly to high contrast, compact display systems and compact SLMs for use in such display systems.

BACKGROUND

Spatial light modulators or SLMs are devices that can control or modulate an incident beam of light in a spatial pattern that corresponds to an electrical input to the devices. The incident light beam, typically generated by a coherent or narrow band light source, such as a laser, is modulated in intensity, phase, polarization or direction to form an image on an imaging plane. Spatial light modulators are increasingly being developed for use in various display systems or applications, such as projectors, movie projectors, planetariums, laser projectors and other display systems.

One type of SLM potentially useful in the aforementioned applications is a microelectromechanical systems (MEMS)-based SLM including an array of dynamically adjustable reflective surfaces or mirrors mounted over a substrate. Existing MEMS-based SLMs include digital micromirror devices (DMDs), commercially available from Texas Instruments, and liquid crystal modulators. In operation electromagnetic radiation or light from a coherent light source, such as a laser, is projected onto the array, an alignment of the mirrors is altered by electronic signals generating electrostatic forces to displace at least some of the mirrors to modulate the phase, intensity and or angle of light reflected from the array.

Another type of MEMS-based SLM suitable for use in the systems and applications above is a compact SLM, such as a Grating Light Valve (GLV™) or Flat Light Valve (FLV™), commercially available from Silicon Light Machines, in San Jose CA. A compact SLM generally includes an array of active-ribbons suspended over a surface of a substrate, each ribbon having a first, light reflective surface that may be moved or deflected relative to a second, passive or static light reflective surface that be formed on a surface of the substrate or on a static ribbon. Each active-ribbon and adjacent static light reflective surface forms a single diffractor or ribbon-pair. The compact SLM modulates incident light by deflecting one or more of active-ribbons in the array relative to the second, passive or static light reflective surface towards the surface of the substrate by an electrostatic force generated between a substrate-electrode and a ribbon-electrode, bringing a coherent light reflected from the active light reflective surface into interference with coherent light reflected from the static light reflective surface. Amplitude modulation is achieved via valve-type phase modulation by modulating a phase of the reflected light by interference between light reflected from the $1^{st}$ and $2^{nd}$ surfaces, and selecting a specific order, typically a $0^{th}$ order, of the reflected light using a spatial filter.

Unfortunately, existing MEMS-based SLMs have a number of problems or shortcomings that limit or prohibit their use in many applications. It has been found that existing or conventional MEMS-based SLMs typically require a large number of mirrors or diffractors for each pixel in the SLM to provide a required contrast in the image produced, resulting in a relatively large SLM that is unsuitable for many applications, such as compact projectors, commonly referred to as pico-projectors, or head mounted display systems or units word by a user. In particular, conventional compact SLMs typically require an array including a large number of ribbons, from several hundred to several thousand, grouped into relatively large pixels, each pixel including from 2 to 20 individual ribbons and having a pixel width or pitch of greater than 5 µm to provide a desired contrast.

Furthermore, because compact SLMs are configured to work most efficiently with one or a narrow range of wavelengths systems in which it is necessary to projector display color images must include multiple such arrays. Typically at least one array each for modulating a red, green and blue light.

Accordingly, there is a need for a compact, MEMs-based SLM and methods of operating the same for use in or with a compact display system or system having a small form factor. It is further desirable that the SLM is capable of providing color images without the use of multiple, independent arrays.

SUMMARY

A microelectromechanical systems based spatial light modulators (SLMs), and display systems and methods for operating the same are provided. Generally, the SLM includes a linear array of active-ribbons suspended over a surface of a substrate, each active-ribbon having a split-ribbon portion including a plurality of diffractors. Each diffractor includes an active light reflective surface on a linear segment of the split-ribbon portion and at least one opening adjacent to the linear segment through which a static light reflective surface below the ribbon is exposed. The static light reflective surface is vertically offset from the active reflective surface by a quiescent optical-gap, and has a substantially equal area with the active light reflective surface. The SLM is configured or operable to bring a coherent light reflected from the active light reflective surface into interference with coherent light reflected from the static light reflective surface when one or more of the active-ribbons are deflected towards the surface of the substrate by an electrostatic force generated between a substrate-electrode and a ribbon-electrode.

In one embodiment, the surface of the substrate is substantially planar and the static light reflective surface is formed on the surface of the substrate. In other embodiments, the static light reflective surface is formed on a structure raised above the surface of the substrate, and the quiescent optical-gap between the static reflective surface and the active reflective surface is less than an electrical-gap separating the ribbon-electrode from the substrate-electrode. For example, the surface of the substrate can be non-planar with a solid structure rising vertically from the surface of the substrate. Alternatively, the structure raised above the surface of the substrate can include a static ribbon on which the static reflective surface(s) is formed. Generally, the quiescent optical-gap between the static reflective surface and the active reflective surface is selected independent of the electrical-gap to enable broadband tuning of the SLM for a wavelength of the coherent light to be modulated.

In some embodiments, the SLM further includes a driver with a number of drive channels, each coupled to the ribbon-electrode in one or more of the number of active-ribbons, and the driver is operable to drive the number of active-ribbons to modulate the coherent light to produce an image on an imaging plane, and to sequentially offset an amount by which active-ribbon is driven in synchronization with a changing wavelength of coherent light illuminating the linear array to provide a time multiplexed color display of modulated light.

The SLM of the present disclosure is particularly useful in a compact display system such as a pico-projector, or a head mounted unit (HMU), such as near eye display, augmented reality, virtual reality, mixed reality or cross reality system, worn by a user.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 16 is a flow chart of a method for operating a compact display system including a single MEMS-based SLM and calibrated to sequential modulate three separate wavelengths for a full color display.

DETAILED DESCRIPTION

Figure 1A:
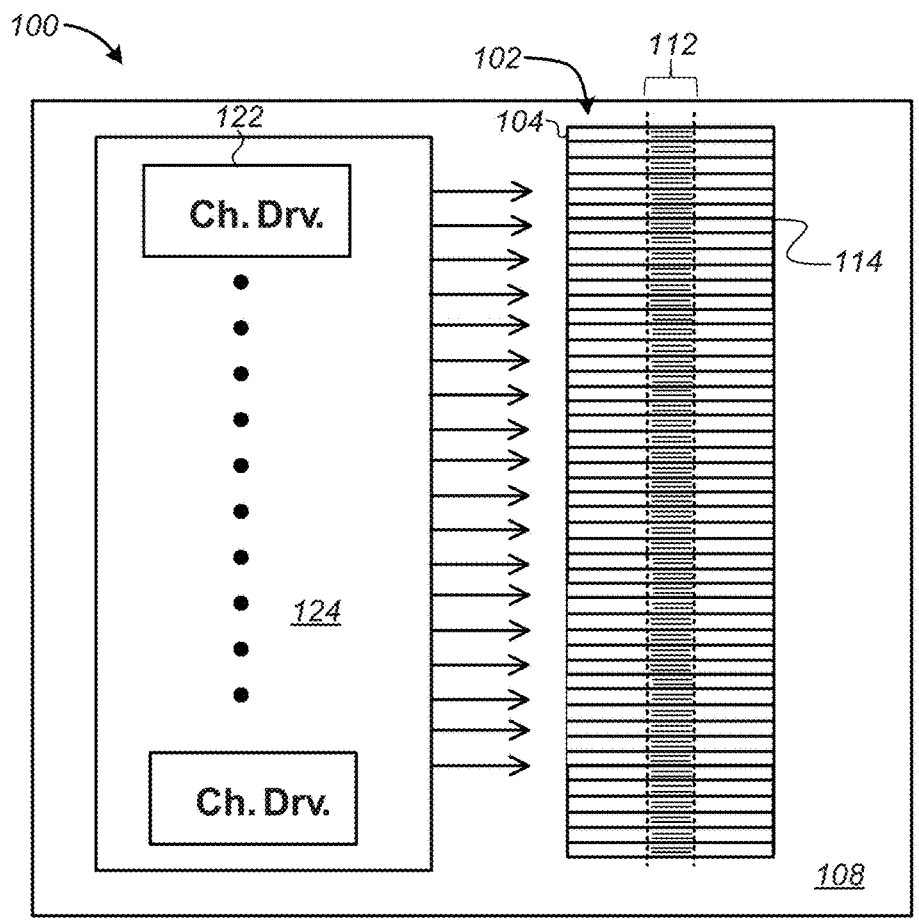
FIGS. 1A and 1B are schematic block diagrams illustrating an embodiment of a Microelectromechanical System (MEMS) based ribbon-type spatial light modulator (SLM) having slotted or split ribbons.

Embodiments of a high contrast, compact (Microelectromechanical System (MEMS) based ribbon-type spatial light modulator (SLM) and systems and methods for using the same are disclosed. In the following description, numerous specific details are set forth, such as specific materials, dimensions and processes parameters etc. to provide a thorough understanding of the present invention. However, particular embodiments may be practiced without one or more of these specific details, or in combination with other known methods, materials, and apparatuses. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

Briefly, the SLM includes a linear array of active-ribbons suspended over a surface of a substrate, each active-ribbon having a split-ribbon portion including a plurality of diffractors. Each diffractor includes an active light reflective surface on a linear segment of the split-ribbon portion and at least one opening adjacent to the linear segment through which a static light reflective surface below the ribbon is exposed. The static light reflective surface is vertically offset from the active reflective surface by a quiescent optical-gap, and has a substantially equal area with the active light reflective surface. The SLM is configured or operable to bring a coherent light reflected from the active light reflective surface into interference with coherent light reflected from the static light reflective surface when one or more of the active-ribbons are deflected towards the surface of the substrate by an electrostatic force generated between a substrate-electrode and ribbon-electrode by a driver with a number of drive channels, each coupled to the ribbon-electrode in one or more of the number of active-ribbons.

Figure 1B:
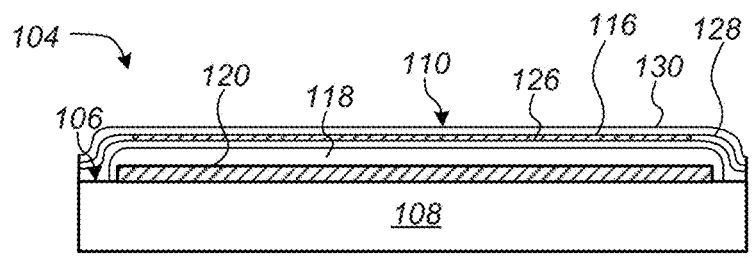

FIGS. 1A and 1B are schematic block diagrams illustrating an embodiment of a Microelectromechanical System (MEMS) based ribbon-type spatial light modulator (SLM) having slotted or split ribbons. For purposes of clarity, many of the details of SLMs in general and active-compact SLMs in particular that are widely known and are not relevant to the present invention have been omitted from the following description. The drawings described are only schematic and are non-limiting. In the drawings, the size of some of the elements may be exaggerated and not drawn to scale for illustrative purposes. The dimensions and the relative dimensions may not correspond to actual reductions to practice of the invention.

Referring to FIGS. 1A and 1B in the embodiment shown the SLM is a one dimensional (1D) compact SLM 100 that includes a linear array 102 composed of thousands of free-standing, addressable electrostatically actuated or deflected active-ribbons 104 supported over a surface 106 of a substrate 108, each active-ribbon having a light reflective surface 110 and a split-ribbon portion 112 including a plurality of diffractors or ribbon-pairs (not shown in these figures) to form a single pixel 114.

Generally, the length of the split-ribbon portion 112 is less than about one third (33%) of a length of the active-ribbon 104. In some embodiments, the length of the split-ribbon portion 112 is less than about ten percent (10%) of the length of the active-ribbon 104. It is noted that as described in greater detail below with respect to a displays system including a compact, compact SLM 100 with split-ribbon active-ribbons 104, only a portion of the linear array 102, including the split-ribbon portions 112 needs to be illuminated.

A schematic sectional side view of an elongated element or active-ribbon 104 of the SLM 100 of FIG. 1A is shown in FIG. 1B. Referring to FIG. 1B, each of the active-ribbons 104 includes a ribbon-electrode 116 and is deflectable through a gap or cavity 118 toward the substrate 108 by electrostatic forces generated when a voltage is applied between the ribbon-electrode in the active-ribbon and a base or substrate-electrode 120 formed in or on the substrate. The ribbon-electrodes 116 are driven by a drive channel 122 in a driver 124, which may be integrally formed on the same substrate 108 with the linear array 102.

In the embodiment shown in FIG. 1A, each of the active-ribbons 104 are driven by a single drive channel 122 to form a compact SLM 100 having a large number of pixels 114. It will be understood however that alternatively two or more of the active-ribbons 104 can be ganged or electrically coupled together so that a single drive channel 122 drives ribbon-electrodes 116 in both active-ribbons, either to form larger pixels 114 having a greater number of diffractors in each pixel, or to form a repeating blaze pattern.

Referring again to FIG. 1B, the active-ribbon 104 includes an elastic mechanical layer 126 to support the active-ribbon above the surface 106 of the substrate 108, a conducting layer 128 forming the ribbon-electrode 116 and a reflective layer 130 including the reflective surface 110 overlying the mechanical layer and conducting layer.

Generally, the mechanical layer 126 comprises a taut silicon-nitride film (SiNx), and is flexibly supported above the surface 106 of the substrate 108 by the mechanical layer at both ends of the active-ribbon 104. The conducting layer 130 can be formed over and in direct physical contact with the mechanical layer 126, as shown, or underneath the mechanical layer. The conducting layer 128 or ribbon-electrode 116 can include any suitable conducting or semi-conducting material compatible with standard MEMS fabrication technologies. For example, the conducting layer 128 or ribbon-electrode 116 can include a doped polycrystalline silicon (poly) layer, or a metal layer. Alternatively, if the reflective layer 130 is metallic it may also serve as the ribbon-electrode 116.

The separate, discrete reflecting layer 130, where included, can include any suitable metallic, dielectric or semiconducting material compatible with standard MEMS fabrication technologies, and capable of being patterned using standard lithographic techniques to form the reflective surface 110.

Figure 2:
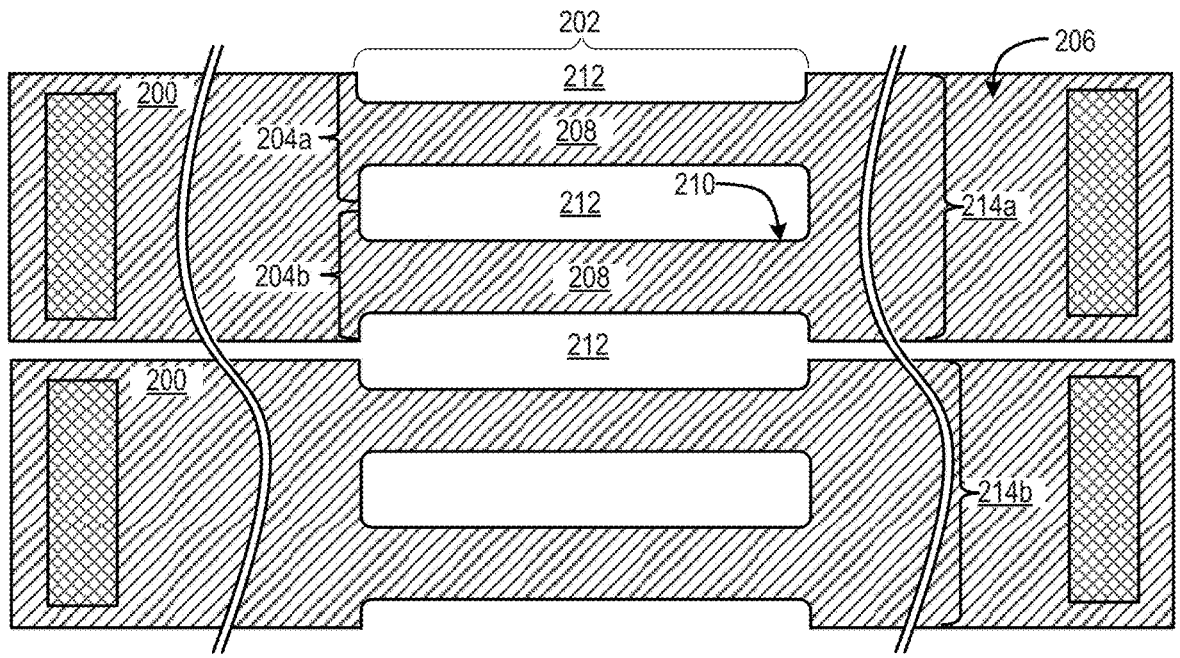
FIG. 2 is a top view of two pixels in a compact SLM with split ribbons having two diffractors or ribbon-pairs per active-ribbon or pixel.

FIG. 2 is a top view of two pixels in a compact SLM with split ribbons having two diffractors or ribbon-pairs per active-ribbon or pixel to decrease pixel size and pitch to provide high contrast amplitude modulation. Referring to FIG. 2, each active-ribbon 200 has a split-ribbon portion 202 including multiple diffractors 204a and 204b, each diffractor including an active light reflective surface 206 on a linear segment 208 of the split-ribbon portion and at least one opening 210 adjacent to the linear segment through which a static light reflective surface 212 below the active ribbon is exposed.

In prior generations of compact SLMs each pixel typically has one or more pairs of an electrostatically deformable or movable ribbon having a first, active reflective surface thereon and a second, static reflective surface. The static reflective surface can be formed either on a non-moving ribbon, such as in a Flat Light Valve (FLV™) or on a surface of the substrate adjoining the moving ribbon, such as in a Grating Light Valve (GLV™).

Moving the movable ribbon brings light reflected from the first, active surface into constructive or destructive interference with light reflected from the second, static surface, thereby enabling amplitude modulation of the light.

The compact SLM with split-ribbon portions, such as shown in FIG. 2, enables each active-ribbon 200 to form a single pixel 214a, 214b per active-ribbon, as compared to a conventional compact SLM, which requires two ribbons (FLV™) or two ribbon widths (GLV™) per pixel. The slotted or split-ribbon design enables higher contrast with a single ribbon for a compact array.

Figure 3:
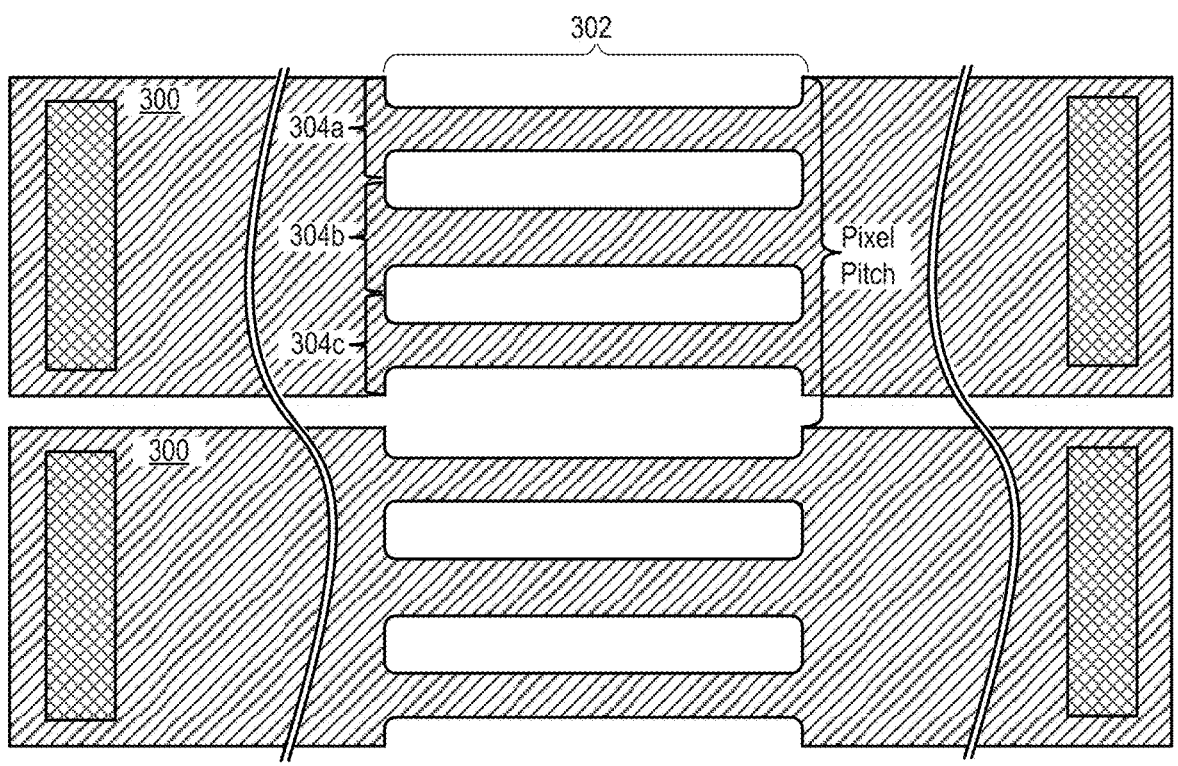
FIG. 3 is a top view of another embodiment two pixels in a compact SLM with split ribbons having three diffractors or ribbon-pairs per active-ribbon or pixel.

FIG. 3 is a top view of another embodiment of active-ribbons 300 in a compact SLM, including split-ribbon portions 302 having three diffractors or ribbon-pairs 304a, 304b, 304c per active-ribbon 300 or pixel. This design is particularly advantageous for visible wavelength operation by providing pixels widths or pitches of less than about 5 µm. Three-ribbon pairs 304a, 304b, and 304c have been found to provide optimal trade-off for contrast to active-ribbon count in compact SLMs at visible wavelengths. Illumination optics and requirement for a size of a ribbon-electrode will determine a region or length of the active-ribbon 300 that needs to be split or slotted, and generally can be very short compared to length of the active-ribbon. For example, for an active-ribbon 300 having total length of greater than 200 micrometers (μm) a split-ribbon portion 302 having a length of about 20 μm has been found to have a minimal effect on electric profile.

Figure 4:
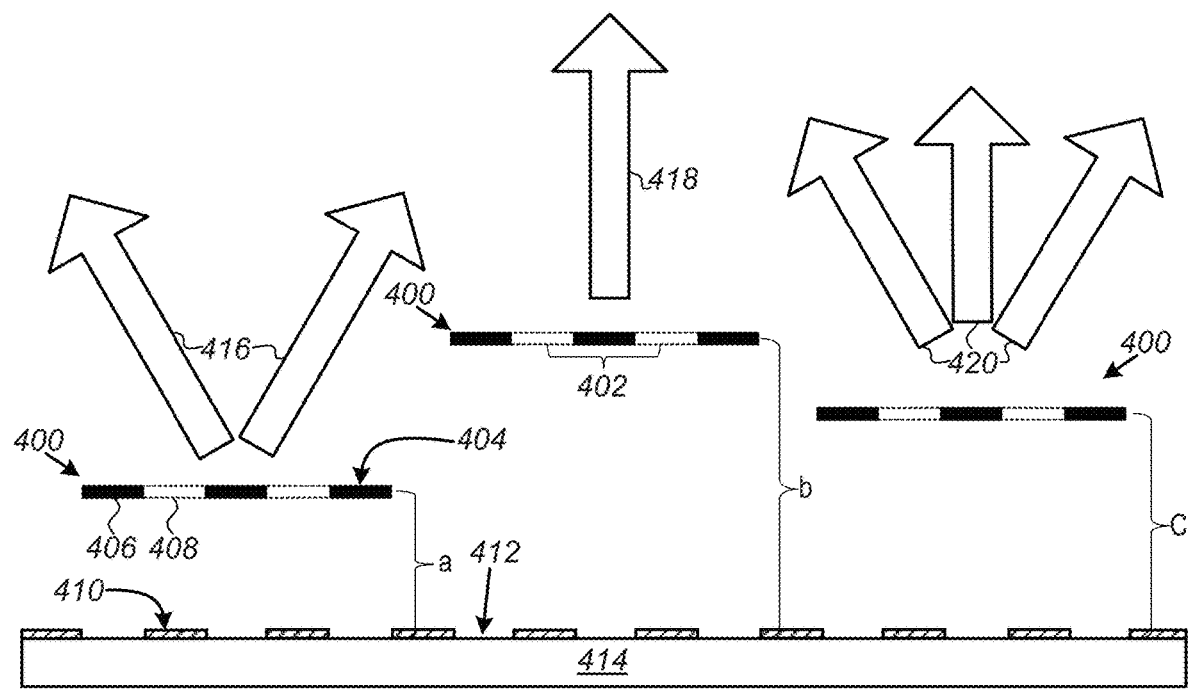
FIG. 4 is a block diagram in cross-sectional side view of three split ribbons or pixels of the compact SLM of FIG. 3 with split ribbons illustrating amplitude operation of the SLM.

FIG. 4 is a block diagram in cross-sectional side view of three active-ribbons 400 or pixels of a compact SLM, each active-ribbon including a split-ribbon portion with three diffractors 402, and each diffractor including an active light reflective surface 404 on a linear segment 406 of the split-ribbon portion and at least one opening 408 adjacent to the linear segment through which static light reflective surfaces 410 are exposed. In the embodiment shown, the static light reflective surfaces 410 are formed on a surface 412 of a substrate 414. Referring to FIG. 4 it is seen that the split-ribbon portions replace three-ribbon pairs in a conventional compact SLM, such as a GLV™. Amplitude modulation is achieved via spatial filtering, where the $1^{st}$ order diffraction is approximately equal to:

$$\frac{\text{Diffraction pitch}}{\lambda}$$

Thus, spatial filtering may be desirable to account for diffraction from neighboring pixels, where:

$$\frac{\text{Pixel pitch}}{\lambda}$$

In the embodiment shown grayscale amplitude modulation depends on the distance from active light reflective surface 404 to the static light reflective surfaces 410. Thus, for the active ribbon 400 on a left-hand side of FIG. 4 where the active light reflective surface 404 is separated from the static light reflective surfaces 410 by a distance a, a $1^{st}$ order reflection from this ribbon (shown by arrows 416) is given by:

$$a = n\frac{\lambda}{2} + \frac{\lambda}{4}$$

where λ is a wavelength of an incident coherent light and n is an integer, all first order light reflected from the active light reflective surface 404 destructively interferes with that from the static light reflective surfaces 410 and the pixel is dark or black.

For the active ribbon 400 in the middle of FIG. 4 where the active light reflective surface 404 is separated from the static light reflective surfaces 410 by a distance b, a $0^{th}$ order reflection from this ribbon (shown by arrow 418) is given by:

$$b = n\frac{\lambda}{2}$$

where λ is the wavelength of an incident coherent light and n is an integer, all $0^{th}$ order light reflected from the active light reflective surface 404 constructively interferes with that from the static light reflective surfaces 410 and the pixel is white.

For the active ribbon 400 on the right-hand side of FIG. 4 where the active light reflective surface 404 is separated from the static light reflective surfaces 410 by a distance c, between a and b, the reflected light (shown by arrows 420) is gray.

Figure 5:
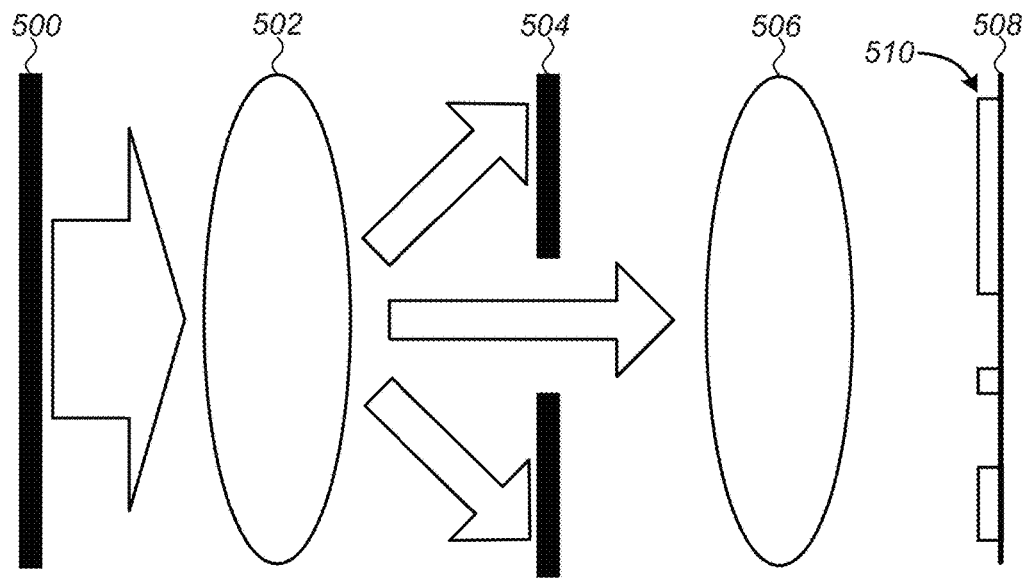
FIG. 5 is simplified optics diagram of the compact SLM of FIG. 3, further including spatial filter and imaging optics illustrating zero order spatial or Fourier filtering.

FIG. 5 is simplified optics diagram of the compact SLM 500, such as that shown in FIGS. 3 and 4, further including an lens 502 for directing modulated light towards or to a spatial filter 504 for zero order spatial or Fourier filtering, and a projection lens 506 for directing a selected order of light towards an imaging plane 508 to for an image 510 thereon.

It is noted that in the embodiments of the compact SLM described above and shown in FIG. 4, the static light reflective surface 410, is formed directly on a substantially planar surface 412 of the substrate 414. It is will be understood that this need not always be the case. In other embodiments, the static light reflective surfaces are formed on a structure raised above the surface of the substrate to decouple a quiescent optical-gap between the static reflective surfaces and active reflective surfaces from an electrical-gap separating the active-ribbons or ribbon-electrodes therein from the surface of the substrate or substrate-electrode. Such embodiments are particularly useful to enable tuning of the compact SLM to modulate a specific wavelength or narrow range of wavelengths, while still optimizing the electrical-gap to improve driving of the active-ribbons.

Figure 6A:
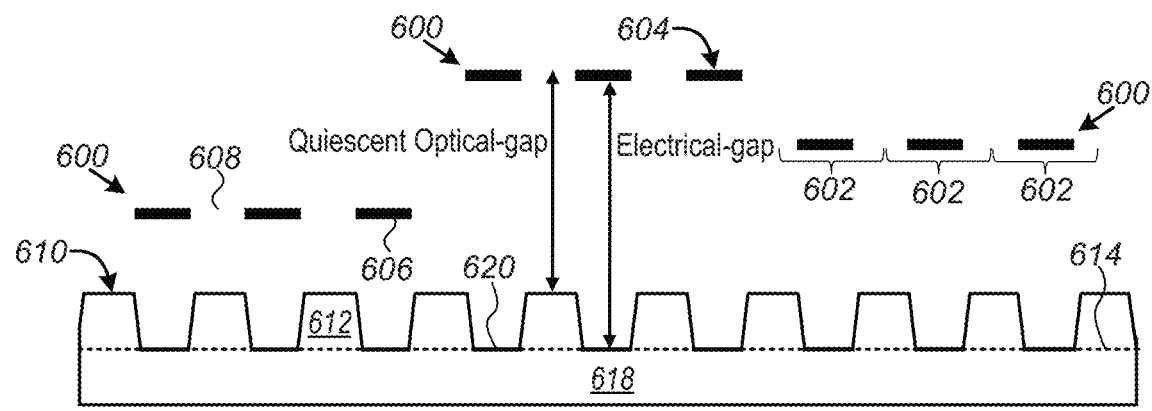
FIG. 6A is a block diagram in cross-sectional side view of a portion of a compact SLM including a structured substrate.

One such embodiment of a compact SLM including active-ribbons with split-ribbon portions and structured substrate will now be described with reference to FIGS. 6A and 6B. FIG. 6A is a block diagram in cross-sectional side view of a portion of a compact SLM including a structured substrate. Referring to FIG. 6A, each active-ribbon 600 including a split-ribbon portion with three diffractors 602, and each diffractor including an active light reflective surface 604 on a linear segment 606 of the split-ribbon portion and at least one opening 608 adjacent to the linear segment through which static light reflective surfaces 610 are exposed. In the embodiment shown, the static light reflective surfaces 610 are formed on ridges or structures 612 raised above a surface 614 of a substrate 618. Alternatively, channels or trenches can be formed into the surface 614 of the substrate 618 immediately underlying the linear segment 606 of the split-ribbon portion. It is noted that the substrate need only be structured or patterned in a region of the split ribbons near a center of the active-ribbons or linear array where the maximum deflection occurs. It is further noted the compact SLM can multiple substrate-electrodes 620 immediately underlying the linear segment 606 of the split-ribbon portion of the active-ribbons 600, as in the embodiment shown. Alternatively, the substrate-electrode 620 can include a single electrode formed in the substrate 618 and underlying both the structures 612 and the linear segments 606 of the split-ribbon portion of the active-ribbons 600.

Figure 6B:
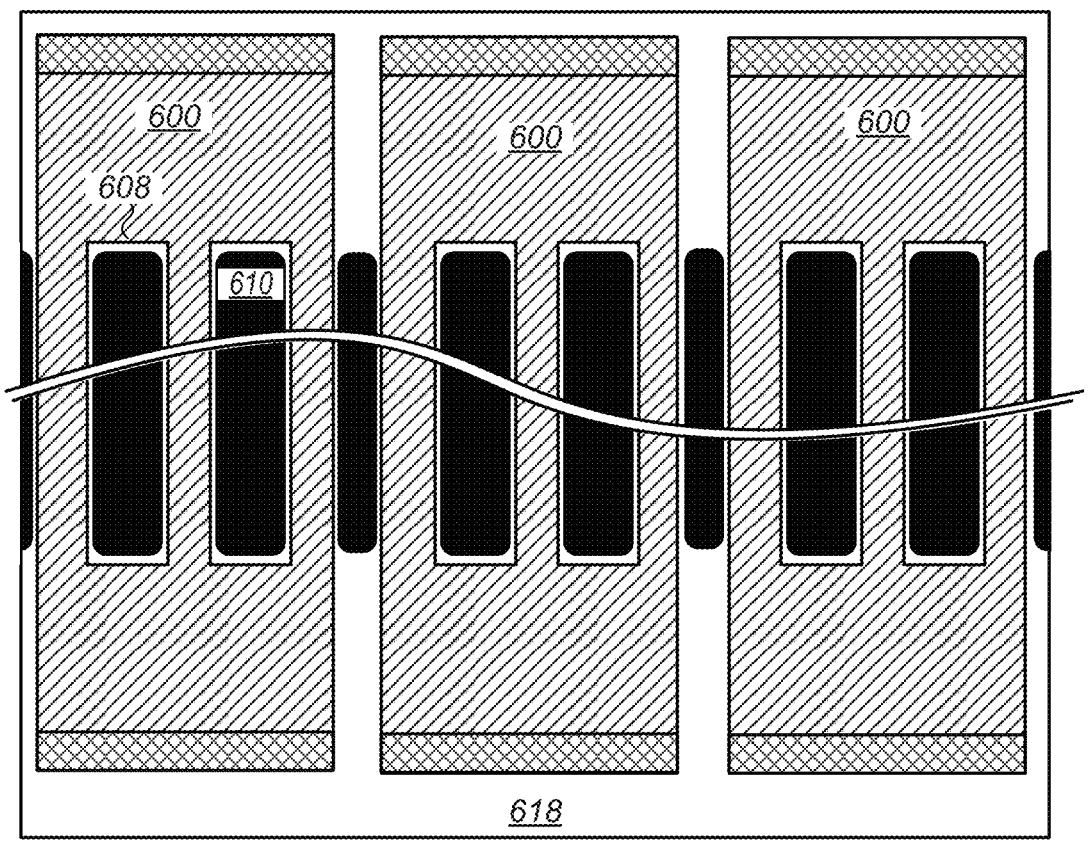
FIG. 6B is a top view of the portion of the compact SLM of FIG. 6A.

FIG. 6B is a top view of the portion of the compact SLM of FIG. 6A.

Figure 7:
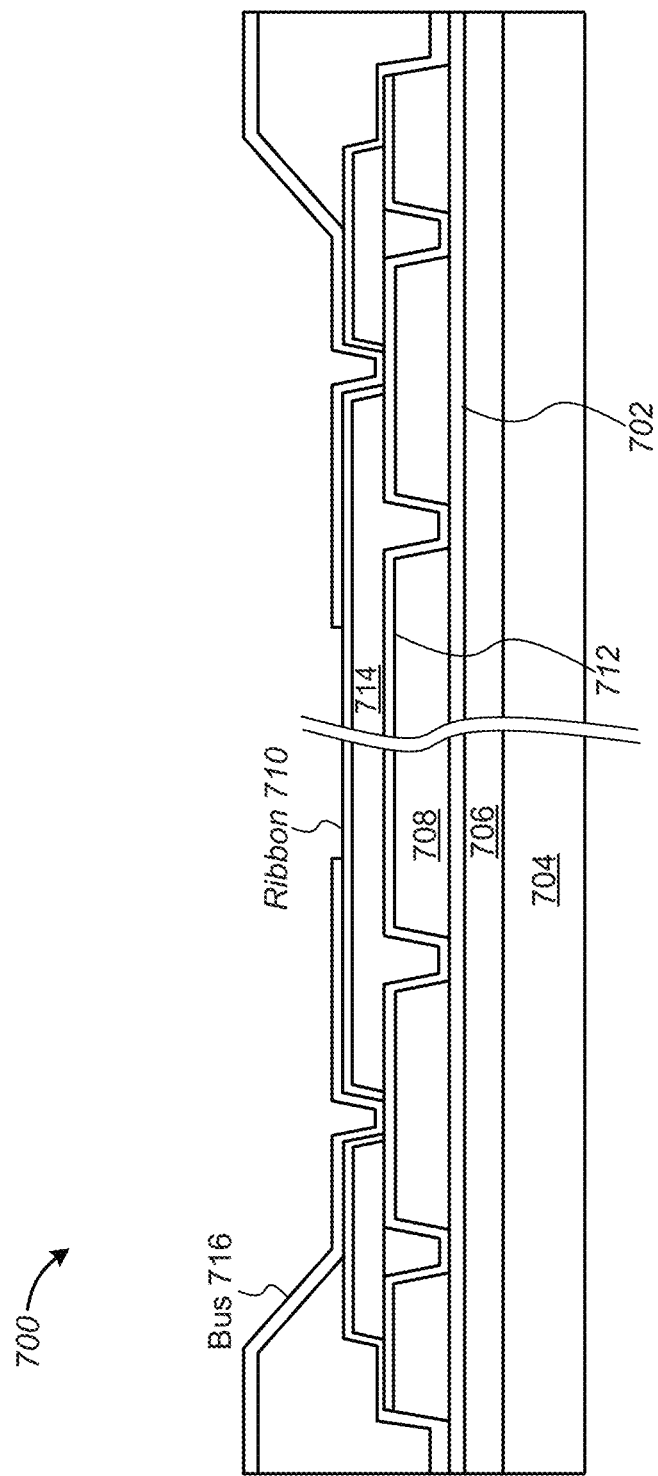
FIG. 7 is a block diagram in cross-sectional side view of a compact SLM including active-ribbons having a split-ribbon and further including a damping structure with an electrically permeable structure under the active-ribbon on which a static light reflective surface is formed.
Figure 8:
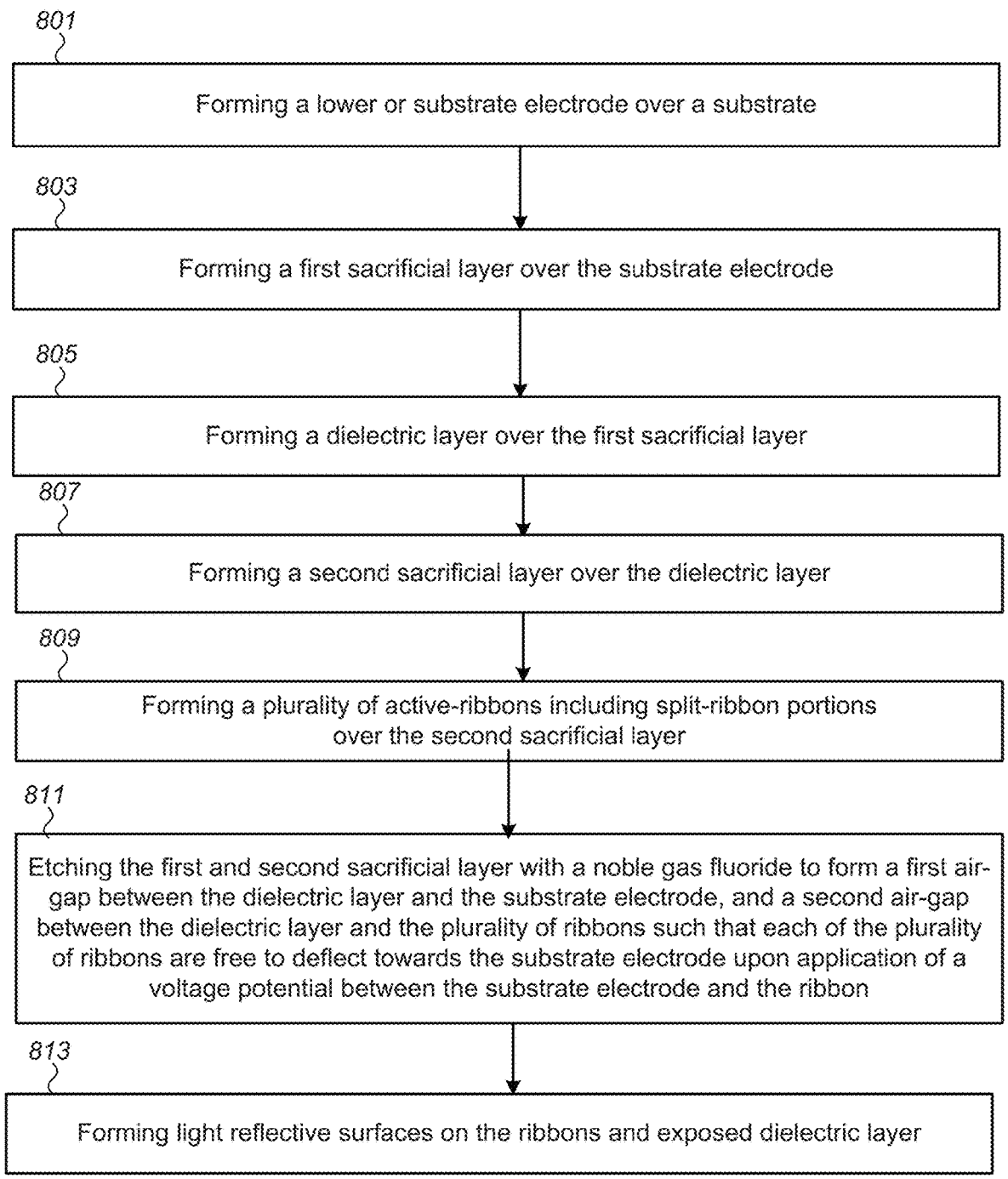
FIG. 8 is a flowchart illustrating a method of fabricating the compact SLM of FIG. 7.
Figure 9:
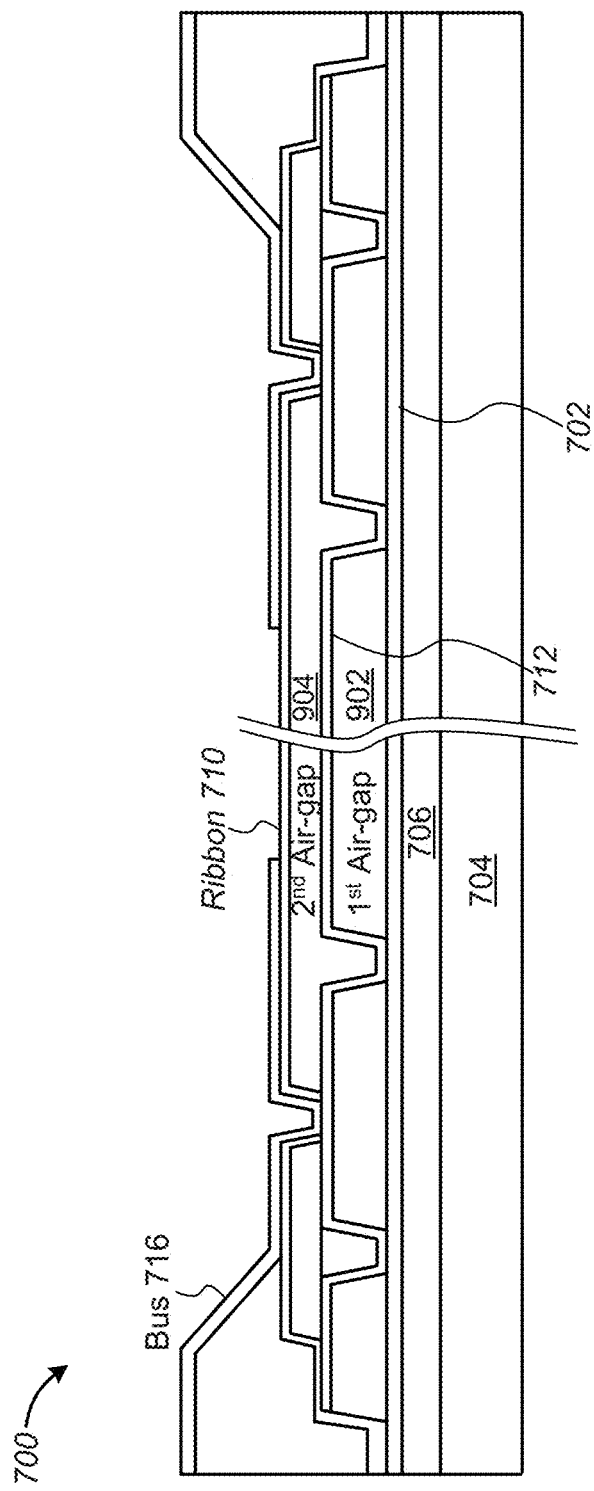
FIG. 9 is a block diagram illustrating a compact SLM with an electrically permeable structure under the active-ribbon on which a static light reflective surface is formed according to the methods described with respect to FIGS. 7 and 8.

In another embodiment, a compact SLM including active-ribbons having a split-ribbon can further including a damping structure with an electrically permeable structure under the active-ribbon on which a static light reflective surface is formed. One such embodiment and method of forming the same will now be described with respect to FIGS. 7 through 9. FIG. 7 is a block diagram illustrating a portion of a compact SLM 700 with a damping structure including electrically permeable structure and a second air-gap under the ribbon at an intermediate point during fabrication of the compact SLM. FIG. 8 is a flowchart illustrating a method of fabricating the compact SLM with a damping structure. FIG.

9 is a block diagram illustrating a compact SLM with a damping structure fabricated according to the embodiments of FIGS. 7 and 8.

Referring to FIGS. 7 and 8, the method begins with forming a lower or substrate-electrode 702 over a wafer or substrate 704 (step 801). Generally, the substrate can include any suitable semiconductor or dielectric material such as silicon, and the substrate-electrode can include one or more layers of any suitable conducting material such as aluminum, copper, tungsten, titanium or alloys thereof and can be deposited using any suitable CVD or PVD technique and patterned using standard photolithographic techniques and etches. Optionally, as in the embodiment shown, the method can further include depositing a thin intermediate dielectric layer 706, such as a silicon oxide over the substrate 704 prior to forming the substrate-electrode 702.

Next, a layer of a sacrificial material is conformably deposited over the substrate-electrode 702 and patterned to form a first sacrificial layer 708 (step 803). Generally, the sacrificial material of the first sacrificial layer 708 can include any suitable material exhibiting a etch selectivity to the materials of the SLM and can be patterned using standard photolithographic techniques and etches. In one embodiment the sacrificial material of the first sacrificial layer 708 can include an amorphous silicon or polysilicon deposited by CVD to a suitable thickness. It is noted that the thickness of the first sacrificial layer 708 determines a thickness of a first air gap (not shown in this figure) of the electrically permeable damping structure. Generally, this first air gap is about ⅔ of an electrical gap between the ribbons 710 and the substrate-electrode 702. Furthermore, since a second air gap, which is subsequently formed between the ribbons 710 and the electrically permeable damping structure is selected to have a thickness about equal to the maximum desired stroke; the thickness of the first sacrificial layer 708 in one embodiment is about equal to twice the desired stroke. Generally the first sacrificial layer 708 has a thickness from about 0.2 µm to about 2 µm.

Next, a dielectric material is deposited and patterned to form a dielectric layer 712 of the electrically permeable damping structure over the first sacrificial layer 708 (step 805). This dielectric layer 712 can include one or more layers of dielectric material such as silicon oxide, silicon nitride or silicon oxynitride and can be deposited by CVD, atomic layer deposition (ALD) or, in the case of silicon oxides, can be thermally grown. The dielectric material is patterned using standard photolithographic techniques and etches to form openings through which the first sacrificial material is exposed for subsequent removal. Generally the thin dielectric layer 712 has a thickness from about 0.1 µm to about 0.5 µm.

Next, a conformal second sacrificial layer 714 is formed over the dielectric layer 712 (step 807). As with the first sacrificial layer 708, the sacrificial material of the second sacrificial layer 714 can include any suitable material exhibiting a etch selectivity to the materials of the SLM and can be patterned using standard photolithographic techniques and etches. In a preferred embodiment, the sacrificial material of the second sacrificial layer 714 is the same as that of the first sacrificial layer 708 to enable it to be removed in single etch step, after the ribbons 710 are formed. Thus, in one embodiment the sacrificial material can include polysilicon deposited by CVD to a suitable thickness. As noted above, the thickness of the second sacrificial layer 714 determines the thickness of a second air gap between the ribbons 710 and the electrically permeable damping structure, and is selected to have a thickness about equal to the maximum desired stroke. Generally the second sacrificial layer 714 has a thickness from about 0.1 µm to about 1.0 µm.

Next, a plurality of ribbons 710 are formed over the second sacrificial layer 714 (step 809). Generally, this involves two to three separate depositions, beginning with deposition of a taut silicon nitride mechanical layer, a top or ribbon-electrode layer, and deposition of a reflective layer, as shown in FIG. 1B. The taut silicon nitride mechanical layer can be deposited by CVD or ALD. The top or ribbon-electrode layer can include any suitable conducting materials used for the substrate-electrode and can be deposited by PVD, CVD or ALD. The reflective layer can include any suitable metal, dielectric or semiconducting material capable of providing a light reflective surface at the desired frequencies and can be deposited by PVD, CVD or ALD, depending on the material. In some embodiments, the ribbon-electrode layer can include a metal that provides a light reflective surface to enable it to also serve as the reflecting layer. After deposition of the mechanical layer, a ribbon-electrode layer, and reflective layer, a drive bus 716 is formed, electrically coupling each ribbon-electrode to a drive channel in a driver (not shown), integrally formed on the same substrate 704 with the compact SLM 700. Next, the mechanical, electrode and reflective layers are patterned or rib-cut using standard photolithographic techniques and one or more etch steps to form the plurality of ribbons 710 including split-ribbon portions. It is noted that this patterning step exposes the first and second sacrificial layers 708, 714 between the ribbons 710 and through openings in the split-ribbon portions facilitating subsequent removal of the underlying sacrificial layers.

Finally, the first and second sacrificial layers 708, 714 are etched or removed using a noble gas fluoride, such Xenon difluoride ($XeF_2$) to form a first air-gap (first air-gap 902 in FIG. 9) between a dielectric layer 712 and a substrate-electrode 702, and a second air-gap (second air-gap 904 in FIG. 9) between the dielectric layer and a plurality of ribbons 710, such that each of the plurality of ribbons are free to deflect towards the substrate-electrode upon application of a voltage potential between the substrate-electrode and the ribbon (step 811).

Finally, first and second light reflective surfaces on the ribbons and exposed dielectric layer (step 813). Generally, the reflective surfaces can include a reflective metal such as, aluminum (Al), gold (Au), or silver (Ag), or a multilayer Bragg mirror, deposited using CVD, PECVD, ALD of sputtering.

Figure 10:
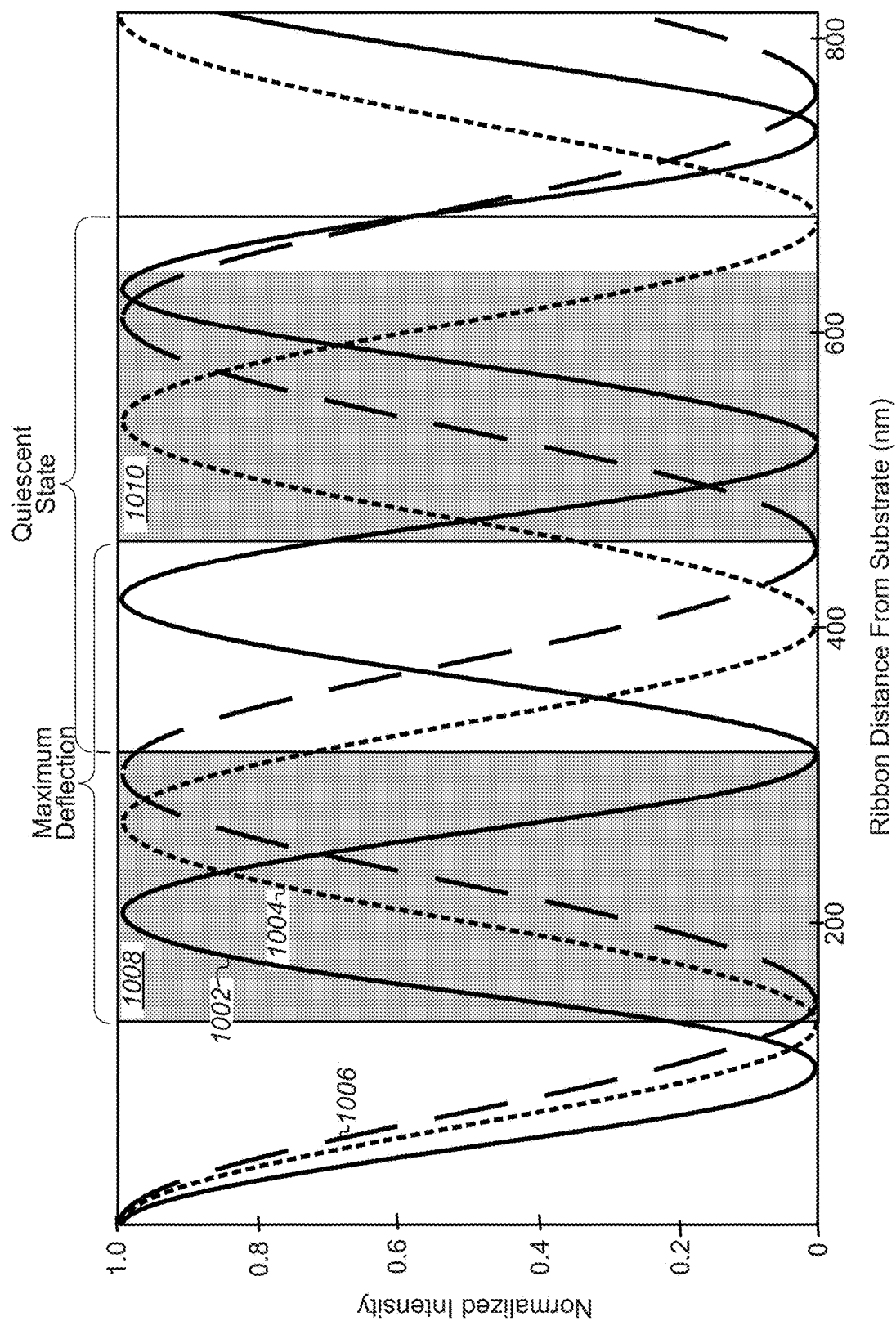
FIG. 10 is a graph of intensity of normal-incidence reflection from a compact SLM as a function of vertical offset between the movable ribbons and stationary reflective surface for different wavelengths of incident light.

In another aspect the present invention is directed to a compact SLM having a single, tunable array of active ribbons to enable modulation of different wavelengths of light from a multi-wavelength light source or multiple single-wavelength light sources to form color images through sequential modulation or time multiplexing. FIG. 10 is a graph of intensity of normal-incidence (zero order) reflection from a compact SLM as a function of vertical offset between first, active light reflective surfaces on the active-ribbons and static light reflective surface for three different wavelengths of incident light, line 1002 represents blue light having a wavelength of about 450-495 nm, line 1004 represents green light having a wavelength of about 495-570, and line 1006 represents red light having a wavelength of about 630-700 nm. Referring to FIG. 10, it is noted that any calibration scheme for three sequentially modulated colors requires a bright and dark rollover for every color. It is further noted that although this graph assumes operation of a compact SLM operated using the zero ($0^{th}$) order, first ($1^{st}$) order operation could be used with a half-wavelength shift from this graph. The graph also holds true for flat light valve operation in which the static light reflective surfaces are formed on passive ribbons always maintained in an undeflected or 0 position.

Referring to FIG. 10 it is noted the graph in shows two different ranges or windows of operation. In the leftmost window 1008 of operation, the non-actuated offset is set to 315 nanometers (nm), or just a little more for margin of error. Operation in this window 1008 can be combined with a minimum, actuated offset of 135 nm, so that a maximum actuation of 180 nm is all that is required to switch from fully on (bright) to fully off (dark) for any the colors illustrated. In particular, operating in this window 1008 it will be possible to modulate red light (line 1006) from its second maximum to its first minimum and the same for green light (line 1004), while blue light (line 1002) will be modulated from its second minimum to its second maximum. The operation windows for the GLV shown in FIG. 10 are determined by ribbon-substrate distance when inactive and at maximum deflection. Generally, the required maximum deflection will be slightly bigger than a quarter of the longest wavelength, for a well-chosen gap.

In an alternative embodiment, to avoid the extra processing required to make a structured substrate, the compact SLM can include static reflective surfaces formed directly on a substantially planar surface of the substrate and can be operated in the right most window 1010 in FIG. 10. In this case the non-actuated offset is set to about 675 nm. This should be combined with a minimum, actuated offset of 457.5 nm, so that we need an actuation of 217.5 nm. Red light (line 1006) will then be possible to modulate from its third maximum to is second minimum, and green light (line 1004) can be modulated from its third minimum to its third maximum, while blue light (line 1002) will be modulated from its fourth maximum to its third minimum. The advantage of operating in window 1008 is that less actuation or deflection of the active-ribbons is needed. On the other hand, operating in window 1010 of not requiring structuring of the substrate.

Figure 11:
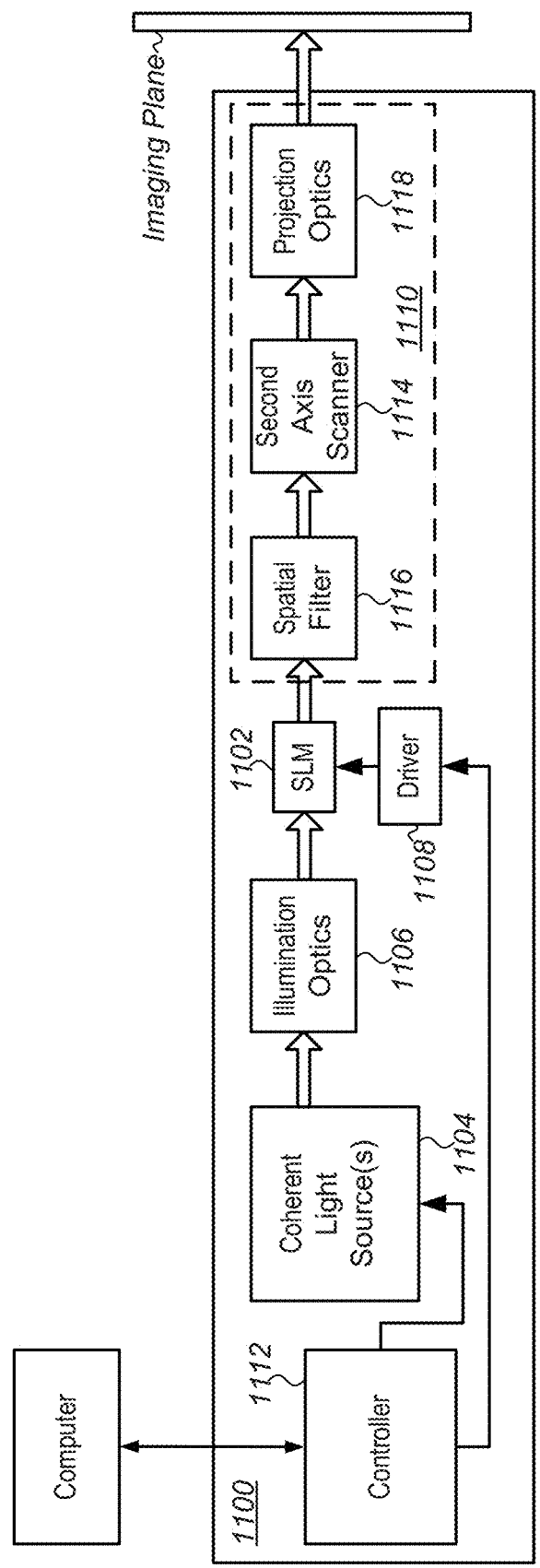
FIG. 11 is a block diagram depicting a display system, such as a head mounted or unit (HMU) or projector system, including a compact SLM according to an embodiment of the present disclosure.

FIG. 11 is a block diagram depicting a display system including a compact SLM having active-ribbons with split-ribbon portions, capable of being operated in a time multiplexed mode operation according to an embodiment of the present disclosure to provide a color display. It is note that the display system can include either a projector system or a head mounted unit (HMU). Where the display system is a HMU, the system can be or be included in a near eye display, such as glasses, goggles or helmet used in an augmented reality (AR), virtual reality (VR), mixed reality (MR) or cross reality (XR) system. Where the display system is a projector system, it can be a pico projector, pocket projector or mobile projector. Referring to FIG. 11, the display system 1100 is coupled to an external computer to receive digital imaging data, and includes in addition to compact SLM 1102 a number of coherent light sources 1104, such as lasers, illumination optics 1106 configured or operable to illuminate the compact SLM with light from the light sources, a driver 1108 configured to drive active-ribbons in the compact SLM to modulate light incident thereon, imaging optics 1110 configured or operable to spatially filter modulated light from the compact SLM, scanning the filtered modulated light along a second axis and project it onto an imaging plane to form a two-dimensional (2D) image thereon, and a controller 1112 to control operation of the light sources 1104, driver 1108, and a second axis scanner 1114 in the imaging optics 1110.

Generally, the light sources 1104 can include multiple light sources, such as lasers, each generating a coherent light at a different wavelength, or a single light source or laser capable of sequentially generating coherent light at different wavelengths at different times. In one embodiment particularly useful for laser marking systems the coherent light sources 1104 are capable of operating in visible wavelength (λ) to generate blue, green and red light to provide a time multiplexed color image in the imaging plane.

The illumination optics 1106 is configured or operable to illuminate at least the split-ribbon portions of the active-ribbons in the compact SLM with a substantially rectangular swath or area of light.

Preferably, the compact SLM 1102 includes a multi-pixel, linear array of from about 10 to about 1088 individual active-ribbons, each including a split-ribbon portion. Generally, the compact SLM 1102 produces a substantially rectangular multi-pixel swath of modulated light that can be scanned along a second axis on the imaging plane to produce the 2D image thereon.

As noted above, the imaging optics 1110 includes a second axis scanner 1114 to scan the swath of modulated light along a second axis, typically perpendicular to the long axis of the swath of modulated light, to produce the 2D image. The second axis scanner 1114 can include dynamic optical elements, such as galvanometric mirrors, to scan the linear swath of modulated light across the surface of the workpiece, and a number of static optical elements to direct modulated light to the galvanometric mirrors and/or to focus the modulated light from the galvanometric mirrors onto the surface of the workpiece. Generally, as in the embodiment shown, the imaging optics 1110 further includes a spatial filter 1116, such as a Fourier filter to select an order, such as a $0^{th}$ order, in the reflected, modulated light, and projection optics 1118, such as one or more lenses, mirrors or prisms to focus the modulated and filtered light onto the imaging plane. In some embodiments, the second axis scanner 1114 may also function as the spatial filter 1116.

Figure 12A:
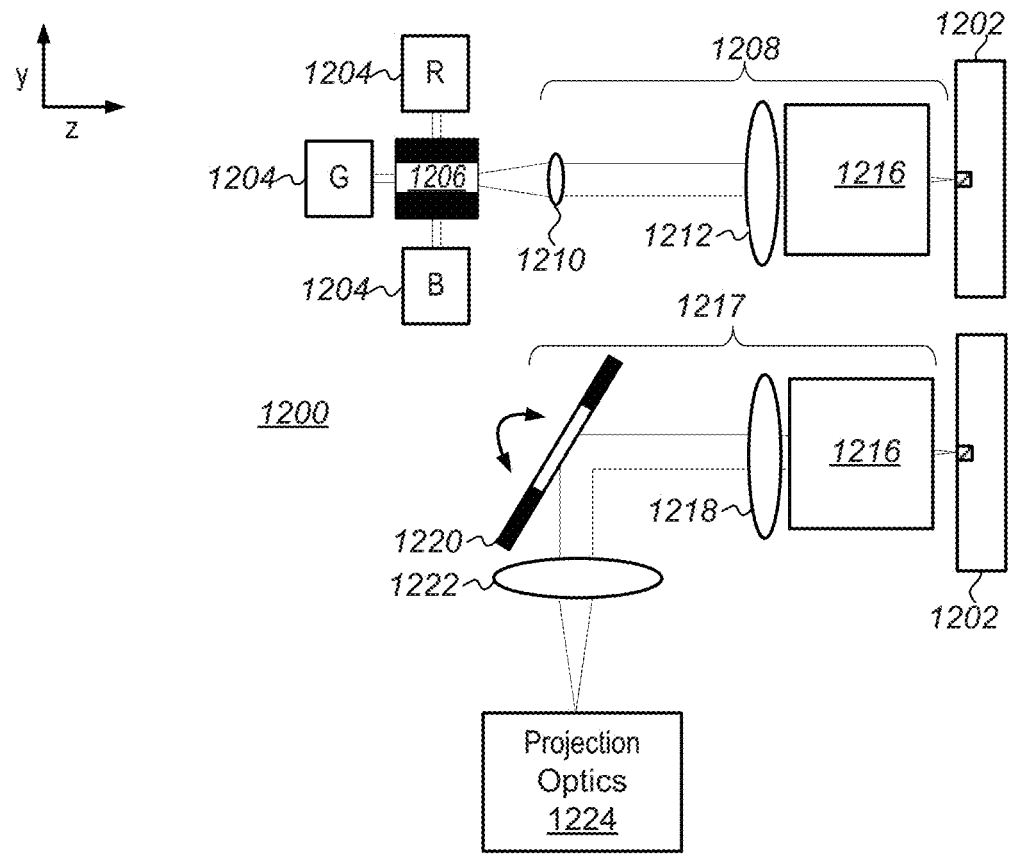
FIGS. 12A and 12B are block and optic diagrams depicting a folded illumination path and secondary axis scanning for a compact SLM.
Figure 12B:
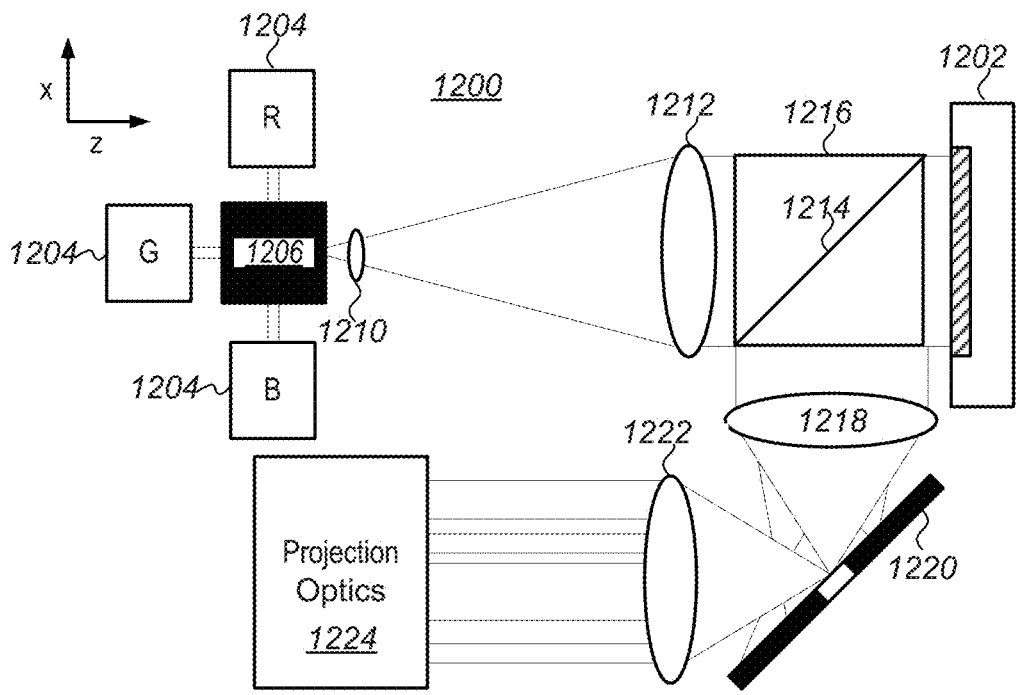

FIGS. 12A and 12B are block optic diagrams depicting folded illumination and secondary axis scanning for a display system 1200 suitable for use in projector and including a compact SLM 1202 having active-ribbons with split-ribbon portions, capable of being operated in a time multiplexed mode operation. In particular, FIG. 12A illustrates a side-view of the system, and FIG. 12B illustrates a top-view of the display system 1200.

Referring to FIGS. 12A and 12B it is noted that the display system 1200 further multiple light sources 1204, each generating a different wavelength or color designated here as R, G, and B for red, green and blue light, a fiber optic color combiner 1206 and sequenced by controller (not shown in this figure), illumination optics 1208 including a fast axis collimator 1210 and a spherical lens 1212 for sheet illumination onto the compact SLM 1202, and a quarter wave polarizer 1214 in a beam splitter 1216 that rotates the sheet illumination onto the compact SLM. Imaging optics 1217, shown in the figure of FIG. 12A, includes in addition to the beam splitter 1216 a second spherical lens 1218, secondary axis scanning mirror or scanner 1220, a third spherical lens 1222, and projection optics 1224 to direct the light onto an imaging plane in a far-field or screen. In the embodiment shown the scanning mirror or scanner 1220 not only provides scanning along the second axis to form the 2D image, it also acts as a spatial filter to select the appropriate order of the reflected, modulate light. Typically, a $0^{th}$ order.

Figure 13:
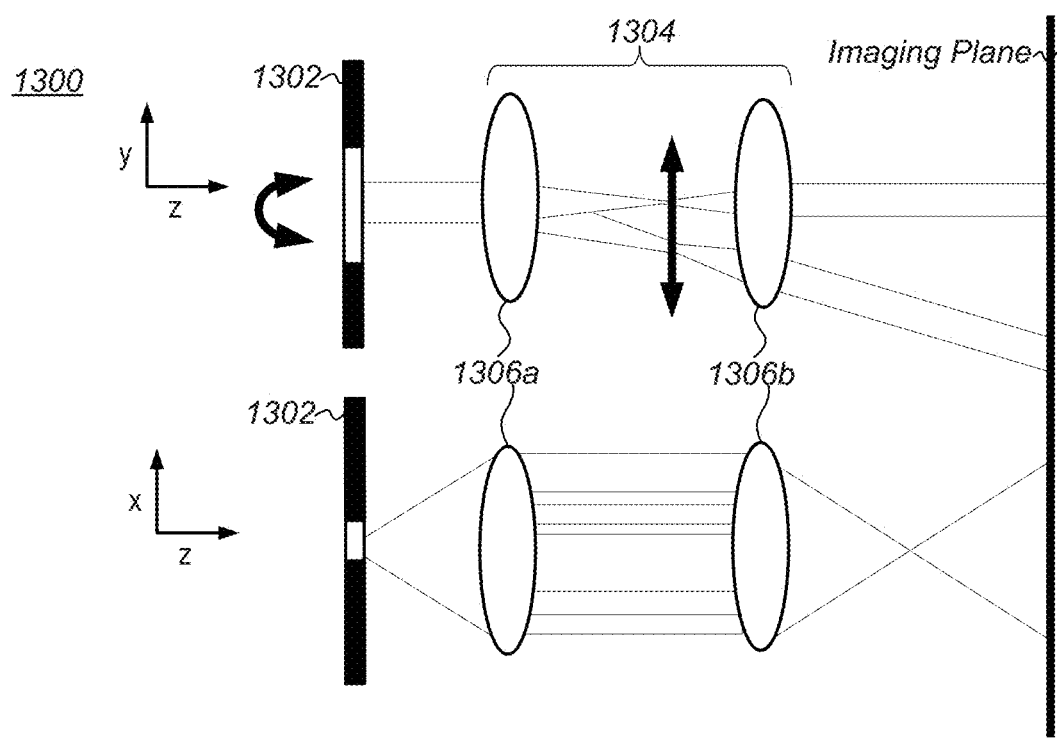
FIG. 13 are optic diagrams depicting projector optics for a projector system including a compact SLM according to an embodiment of the present disclosure.
Figure 14:
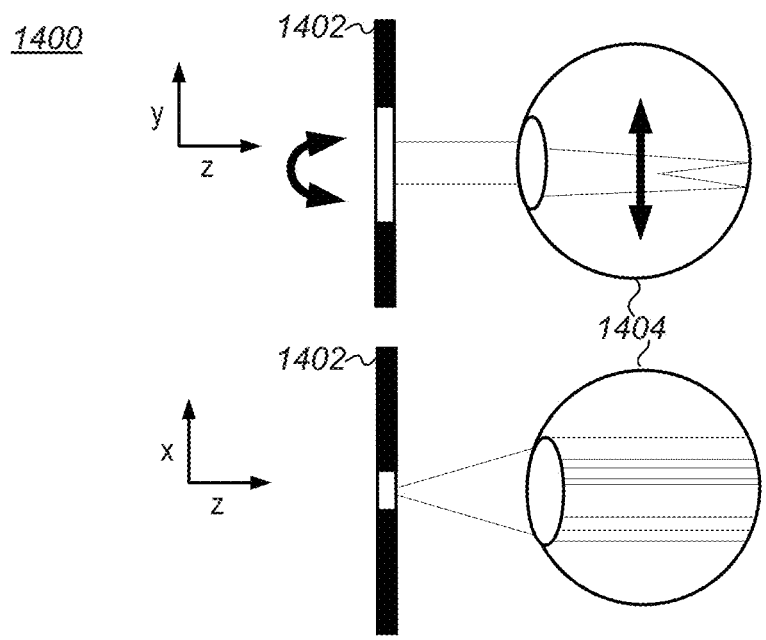
FIG. 14 are optic diagrams near eye optics for an HMU or system including a compact SLM according to an embodiment of the present disclosure.

FIGS. 13 and 14 are optic diagrams near eye optics for an HMU or system including a compact SLM according to an embodiment of the present disclosure. In both figures the input light is amplitude modulated sheet scanned in an orthogonal direction.

FIG. 13 depicts projector optics for a projector system 1300 including a compact SLM 1302. Referring to FIG. 13, in addition to the compact SLM 1302 the projector system 1300 further includes projection optics 1304 including a first spherical lens 1306a and a second spherical lens 1306b. The additional spherical lens 1306b reforms the amplitude modulated image on an imaging plane in a far-field. Generally, the swath of modulated light from the compact SLM 1302 can be scanned in an orthogonal direction as shown in the top figure to form a 2D image.

FIG. 14 depicts optic diagrams for near eye optics in an HMU system 1400. Referring to FIG. 14 it is noted that the focal lengths of a SLM 1402 in the system 1400 are chosen to create virtual image that is then formed onto a retina in a user's eye 1404. Because the retina is directly conjugate to SLM 1402 of the HMU system 1400, the image will appear to form at infinity, and can be scanned in an orthogonal direction as shown in the top figure.

Figure 15:
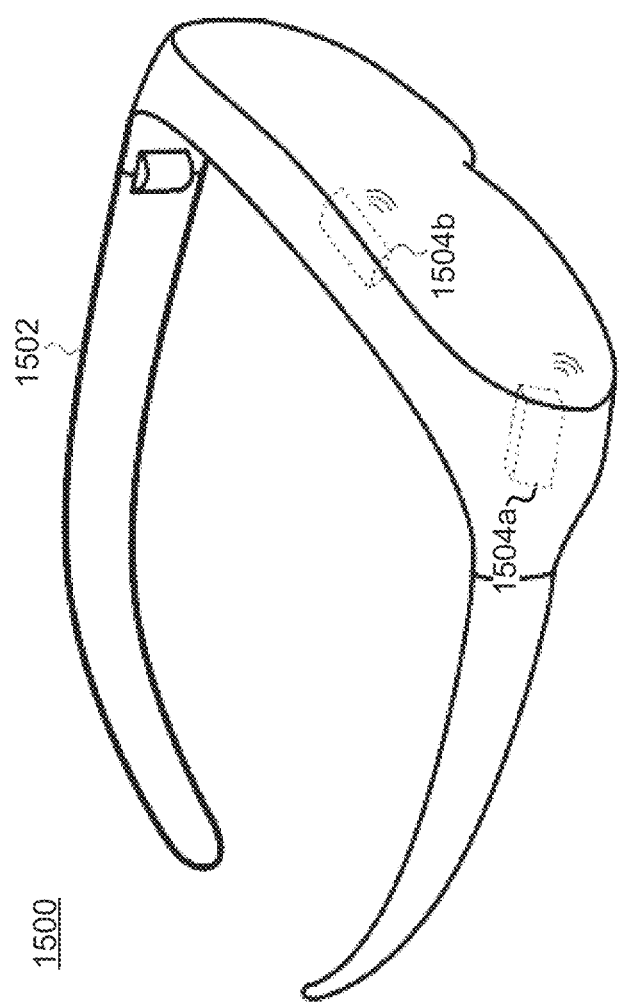
FIG. 15 illustrates an embodiment of glasses or goggles to be worn on the head of a user in which a compact display system is in a housing affixed to the glasses or goggles in various locations.

FIG. 15 illustrates an embodiment of a HMU 1500 including glasses or goggles 1502 to be worn on the head of a user in which a compact display system is in a housing affixed to the glasses or goggles in various locations. Referring to FIG. 15, in the embodiment shown the goggles 1502 include more than one housing, including housing 1504a, affixed to a side arm of the glasses or goggles, while another (housing 1504b) is affixed elsewhere on the body of the glasses or goggles, such as a point near the bridge thereof. It is noted that while multiple cameras enclosed in multiple housings 1504a, 1504b, are shown in FIG. 15, a single display system enclosed in a single housing, either 1504a or 1504b, may be sufficient to depending on the application for which the HMU 1500 is being used. For example, for an augmented reality (AR) application it may be sufficient or even desirable that an image is presented into only one of the user's eyes. Alternatively, in some applications it may be desirable to have multiple cameras enclosed in multiple linked display systems, housed in one or more housings 1504a, 1504b, each positioned and configured or operable to present an image to a separate eye of the user to provide a more immersive experience, for example in a virtual reality (VR) application.

FIG. 16 is a flow chart of a method for operating a compact display system including a single MEMS-based SLM and calibrated to sequential modulate three separate wavelengths for a full color display. Referring to FIG. 16, the method begins with providing a display system including multiple light sources each generating a coherent light at a different wavelength (or a single light source capable of sequentially generating coherent light at different wavelengths at different times), and a single, compact SLM tuned including a single, linear array of active-ribbons with split ribbon portions (step 1602). Preferably, the linear array of the compact SLM is tuned modulate wavelengths from each of the multiple light sources using broadband tuning as described above with reference to FIG. 10. Next, at a first time at least a portion of the linear array including the split ribbon portions is illuminated with a coherent light from one of the multiple light sources (step 1604), and a driver including a number of drive channels operated to deflect one or more of the active-ribbons is towards the surface of the substrate to bring coherent light reflected from the active-ribbons into interference with light reflected from a static light reflective surface (step 1606). Preferably, the driver is further operated to sequentially offset an amount by which the active-ribbons are driven depending on the wavelength of light being modulated. The modulated light is then spatially filtered to select the desired order of the reflected light, for example the 0th order, scanned along a second axis and projected onto an imaging plane (step 1608). At a second or subsequent time the linear array is illuminated with a coherent light from another one of the multiple light sources and process repeated to provide time multiplexed color image in the imaging plane (step 1610).

Thus, embodiments of high-contrast compact, compact SLM and display systems including the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A spatial light modulator (SLM) comprising:
a linear array of a number of active-ribbons suspended over a surface of a substrate, each active-ribbon having a split-ribbon portion, the split-ribbon portion including a plurality of diffractors, each diffractor including an active light reflective surface on a linear segment of the split-ribbon portion and at least one opening adjacent to the linear segment through which a static light reflective surface below the ribbon is exposed, the static light reflective surface vertically offset from the active reflective surface by a quiescent optical-gap,
wherein the active light reflective surface and the static light reflective surface have an equal area, and
wherein the SLM is operable to, when one or more of the active-ribbons are deflected towards the surface of the substrate by an electrostatic force generated between a substrate-electrode and a ribbon-electrode, bring a coherent light reflected from the active light reflective surface into interference with coherent light reflected from the static light reflective surface.

2. The SLM of claim 1, wherein the linear array comprises a plurality of active-ribbons arranged parallel to each other and perpendicular to a long axis of the linear array, and wherein each active-ribbon forms a single pixel of the SLM.

3. The SLM of claim 1, wherein a length of the split-ribbon portion is less than about ten percent (10%) of a length of the active-ribbon.

4. The SLM of claim 1, wherein the surface of the substrate is substantially planar and the static light reflective surface is formed on the surface of the substrate.

5. The SLM of claim 1, wherein the static light reflective surface is formed on a structure raised above the surface of the substrate, and wherein the quiescent optical-gap between the static reflective surface and the active reflective surface is less than an electrical-gap separating the ribbon-electrode from the substrate-electrode.

6. The SLM of claim 5, wherein the surface of the substrate is non-planar, and the structure is a solid structure rising vertically from the surface of the substrate.

7. The SLM of claim 5, wherein the structure raised above the surface of the substrate comprises a static ribbon.

8. The SLM of claim 5, wherein the quiescent optical-gap between the static reflective surface and the active reflective surface is selected independent of the electrical-gap to enable broadband tuning of the SLM for a wavelength of the coherent light to be modulated.

9. The SLM of claim 1, further comprising an electrically permeable damping structure including a dielectric layer suspended above and separated from the surface of the substrate by a first air-gap, and from the number of ribbons by a second air-gap, wherein the static light reflective surface is formed on the dielectric layer, and wherein the quiescent optical-gap between the static reflective surface and the active reflective surface is less than an electrical-gap separating the ribbon-electrode from the substrate-electrode.

10. The SLM of claim 9, wherein the quiescent optical-gap between the static reflective surface and the active reflective surface is selected independent of the electrical-gap to enable broadband tuning of the SLM for a wavelength of the coherent light to be modulated.

11. The SLM of claim 1, further comprising a driver including a number of drive channels, each drive channel coupled to the ribbon-electrode in one or more of the number of active-ribbons, wherein the driver is operable to drive the number of active-ribbons to modulate the coherent light to produce an image on an imaging plane, and wherein the driver is further operable to sequentially offset an amount by which active-ribbon is driven in synchronization with a wavelength of coherent light illuminating the linear array to provide time multiplexed color display of modulated light.

12. A display system comprising:
a spatial light modulator (SLM) including a linear array of a number of active-ribbons suspended over a surface of a substrate, each active-ribbon having a split-ribbon portion, the split-ribbon portion including a plurality of diffractors, each diffractor including an active light reflective surface on a linear segment of the split-ribbon portion and at least one opening adjacent to the linear segment through which a static light reflective surface below the ribbon is exposed, the static light reflective surface vertically offset from the active reflective surface by a quiescent optical-gap, the active light reflective surface and the static light reflective surface having an equal area;
a coherent light source operable to illuminate the linear array;
a controller operable to control the coherent light source and to control a driver including a number of drive channels, each coupled to generate an electrostatic force between a substrate-electrode and a ribbon-electrode in one or more of the number of active-ribbons to deflect one or more of the active-ribbons is towards the surface of the substrate to bring coherent light reflected from the active light reflective surface into interference with coherent light reflected from the static light reflective surface to modulate the coherent light; and
imaging optics to project the modulated light onto an imaging plane to produce an image thereon.

13. The display system of claim 12, wherein the linear array comprises a plurality of active-ribbons arranged parallel to each other and perpendicular to a long axis of the linear array, and further comprising illumination optics operable to illuminate only the split-ribbon portion of the plurality of active-ribbons with light from the coherent light source.

14. The display system of claim 12, wherein the static light reflective surface is formed on a structure raised above the surface of the substrate, and wherein an electrical-gap separating the ribbon-electrode from the substrate-electrode is greater than the quiescent optical-gap, and is selected independent of the quiescent optical-gap to enable broadband tuning of the SLM for a wavelength of the coherent light to be modulated.

15. The display system of claim 12, wherein the driver is further operable to sequentially offset an amount by which the active-ribbons are driven in synchronization with changing wavelengths of coherent light illuminating the linear array to provide time multiplexed color image in the imaging plane.

16. The display system of claim 12, wherein the display system is included a head mounted unit (HMU) worn by a user.

17. The display system of claim 12, wherein the display system is included a compact projector, the SLM is operable to form a substantially linear swath of modulated light comprising light from multiple pixels of the SLM, and wherein the imaging optics further includes a spatial filter to select a $0^{th}$ order of modulated light reflected from the SLM, and a scanner to scan the linear swath of modulated light along a second axis perpendicular to the linear swath to project a two-dimensional (2D) image on the imaging plane.

18. A method of operating a display system comprising:
illuminating a spatial light modulator (SLM) with coherent light from a coherent light source, the SLM including a linear array of a number of active-ribbons suspended over a surface of a substrate, each active-ribbon having a split-ribbon portion, the split-ribbon portion including a plurality of diffractors, each diffractor including an active light reflective surface on a linear segment of the split-ribbon portion and at least one opening adjacent to the linear segment through which a static light reflective surface below the ribbon is exposed, the static light reflective surface vertically offset from the active reflective surface by a quiescent optical-gap, the active light reflective surface and the static light reflective surface having an equal area;
operating a driver including a number of drive channels, each coupled to generate an electrostatic force between a substrate-electrode and a ribbon-electrode in one or more of the number of active-ribbons to deflect one or more of the active-ribbons is towards the surface of the substrate to bring coherent light reflected from the active light reflective surface into interference with coherent light reflected from the static light reflective surface to modulate the coherent light; and projecting modulated light from the SLM onto an imaging plane to produce an image thereon.

19. The method of claim 18, wherein the static light reflective surface is formed on a structure raised above the surface of the substrate, and wherein an electrical-gap separating the ribbon-electrode from the substrate-electrode is greater than the quiescent optical-gap, and is selected independent of the quiescent optical-gap to enable broadband tuning of the SLM for a wavelength of the coherent light to be modulated.

20. The method of claim 18, wherein the driver is further operable to sequentially offset an amount by which the active-ribbons are driven, and further comprising sequentially offsetting deflection of the active-ribbons in synchronization with changing wavelengths of coherent light illuminating the linear array to provide time multiplexed color image in the imaging plane.

* * * * *